(12) United States Patent
Nordell et al.

(10) Patent No.: US 11,733,674 B2
(45) Date of Patent: Aug. 22, 2023

(54) SELECTION OF STRATEGY FOR MACHINING A COMPOSITE GEOMETRIC FEATURE

(71) Applicant: SANDVIK MACHINING SOLUTIONS AB, Sandviken (SE)

(72) Inventors: Hugo Nordell, Hagersten (SE); Vahid Kalhori, Gavle (SE); Mattias Vanberg, Gavle (SE)

(73) Assignee: Sandvik Machining Solutions AB, Sandviken (SE)

( * ) Notice: Subject to any disclaimer, the term of this patent is extended or adjusted under 35 U.S.C. 154(b) by 146 days.

(21) Appl. No.: 17/251,534

(22) PCT Filed: Jun. 13, 2019

(86) PCT No.: PCT/EP2019/065423
§ 371 (c)(1),
(2) Date: Dec. 11, 2020

(87) PCT Pub. No.: WO2019/238797
PCT Pub. Date: Dec. 19, 2019

(65) Prior Publication Data
US 2021/0255601 A1   Aug. 19, 2021

(30) Foreign Application Priority Data

Jun. 14, 2018 (EP) ..................... 18177834
Sep. 7, 2018 (EP) ..................... 18193183

(51) Int. Cl.
*G05B 19/4097* (2006.01)
*G05B 19/4099* (2006.01)
(Continued)

(52) U.S. Cl.
CPC ..... *G05B 19/4097* (2013.01); *G05B 19/4065* (2013.01); *G05B 19/4099* (2013.01);
(Continued)

(58) Field of Classification Search
CPC ............ G05B 19/4097; G05B 19/4065; G05B 19/40931; G05B 19/40937;
(Continued)

(56) References Cited

U.S. PATENT DOCUMENTS 6,047,225 A    4/2000 Iriguchi et al.
10,466,681 B1 * 11/2019 Jones ............... G05B 19/40937
(Continued)

FOREIGN PATENT DOCUMENTS

WO          02093350 A1    11/2002
WO       2009099696 A1     8/2009
WO       2018083512 A1     5/2018

OTHER PUBLICATIONS

Yuan-Shin et al: "Feature-composition approach to planning and machining of generic virtual pockets", Computers in industry, Elsevier, Amsterdan, NL. vol. 31, No. 2, Nov. 1, 1996, pp. 99-128.

*Primary Examiner* — Kenneth M Lo
*Assistant Examiner* — Mohammed Shafayet
(74) *Attorney, Agent, or Firm* — Corinne R. Gorski

(57) ABSTRACT

A method and a corresponding system and computer program are provided. A model of an object to be manufactured via subtractive manufacturing is obtained. Geometric features to be machined as part of manufacturing the object are identified based on the model. The identified geometric features include a composite geometric feature including a plurality of geometric subfeatures. A database including strategies for machining different geometric features is accessed. The database includes a composite strategy for machining the composite geometric feature and separate strategies for machining the respective geometric subfeatures. Strategies for machining the respective geometric features are selected from the strategies included in the database. Instructions for causing one or more machine tools to manufacture the object in accordance with the selected
(Continued)

strategies are provided. Selecting strategies for machining the respective geometric features via subtractive manufacturing includes selecting the composite strategy for machining the composite geometric feature.

12 Claims, 7 Drawing Sheets

(51) Int. Cl.
  *G05B 19/4093* (2006.01)
  *G05B 19/4065* (2006.01)
(52) U.S. Cl.
  CPC . *G05B 19/40931* (2013.01); *G05B 19/40937* (2013.01); *G05B 2219/35012* (2013.01); *G05B 2219/36252* (2013.01); *G05B 2219/36284* (2013.01); *G05B 2219/36499* (2013.01); *G05B 2219/42155* (2013.01)

(58) Field of Classification Search
  CPC ...... G05B 19/4099; G05B 2219/35012; G05B 2219/36252; G05B 2219/36284; G05B 2219/36499; G05B 2219/42155; G05B 19/409; G05B 19/4093; G05B 2219/35168; Y02P 90/02
  See application file for complete search history.

(56) References Cited

U.S. PATENT DOCUMENTS

| | | | |
|---|---|---|---|
| 2003/0171841 A1* | 9/2003 | Porter | G05B 19/4097 700/182 |
| 2008/0004745 A1* | 1/2008 | Nasu | G05B 19/4097 700/182 |
| 2015/0025672 A1 | 1/2015 | Hemmanur et al. | |
| 2016/0019270 A1* | 1/2016 | Jones | G06F 16/248 700/98 |
| 2019/0310608 A1* | 10/2019 | Amer | G05B 19/4097 |

\* cited by examiner

SELECTION OF STRATEGY FOR MACHINING A COMPOSITE GEOMETRIC FEATURE

RELATED APPLICATION DATA

This application is a § 371 National Stage Application of PCT International Application No. PCT/EP2019/065423 filed Jun. 13, 2019 claiming priority to EP 18177834.1 filed Jun. 14, 2018 and EP 18193183.3 filed Sep. 7, 2018.

TECHNICAL FIELD

The present disclosure generally relates to machining, and in particular to process planning for machining operations for subtractive manufacturing.

BACKGROUND

Computer-aided design (CAD) models are often employed to define objects to be manufactured. Tolerances and other requirements for the objects to be manufactured may also be obtained via product and manufacturing information (PMI). The manufacturing may be performed via machining operations performed by one or more machine tools. A cutting tool mounted in the machine tool is moved by the machine tool relative to a work piece, so that the cutting tool cuts away material from the work piece to form the object to be manufactured.

Computer-aided manufacturing (CAM) is typically employed to decide how to manufacture the object defined by the CAD model. This is a complicated task involving many factors/parameters such as selecting machine tools, operation sequences (for example involving roughing, semi-finishing and finishing), operation strategies, fixtures for holding the work piece, cutting tools, tool paths, and cutting data (such as feed rate, cutting speed, and depth of cut). These factors affect the quality and precision of the manufactured object, and may also affect the manufacturing time and/or wear on the cutting tools. Hence, CAM programmers often need plenty of time and experience for making suitable tradeoffs so as to reach a suitable solution to this complicated task. Modern CAM software may include some elements of automation for assisting CAM programmers, but CAM programmers still need to rely on experience as well as trial and error to actually reach a suitable solution. An object to be manufactured may include many different geometric features to be machined. It may therefore take the CAM programmer plenty of time to go through all those features and define how these features are to be machined.

Computer numerically controlled (CNC) machine tools are typically employed for the manufacturing. Post-processing is employed to convert the result of the CAM programming into machine code executable by the control system of the CNC machine tool in which the object is to be manufactured. Machine operators (or CNC operators) often adapt or modify the machine code based on their own knowledge and experience of the machine tool. Preference as regards machining method and for achieving desired results may for example lead the machine operator to modify the machine code. It may also be necessary to modify the machine code to make corrections for mistakes made in the CAM programming. CNC operators may need plenty of time and/or experience for making appropriate modifications of the machine code. Moreover, test runs are often employed to check that the machine code actually causes the machine to perform as expected. Computer simulations may also be performed to detect potential problems. Test runs and simulations may for example incur extra costs and/or cause delays.

It would be desirable to provide new ways to address one or more of the abovementioned issues.

SUMMARY

Methods, systems and computer programs having the features defined in the independent claims are provided for addressing one or more of the abovementioned issues. Preferable embodiments are defined in the dependent claims.

Hence, a first aspect provides embodiments of a method. The method comprises obtaining a model of an object to be manufactured via subtractive manufacturing (such as metal cutting), and identifying, based on the model, a plurality of geometric features to be machined as part of manufacturing the object. The plurality of geometric features comprises a composite (or relatively more complex) geometric feature which includes a plurality of geometric subfeatures (or relatively less complex geometric features). The method comprises accessing a database including (or storing) strategies for machining different geometric features. The database includes a composite strategy for machining the composite geometric feature and separate strategies for machining the respective geometric subfeatures. The method comprises selecting, from the strategies included in the database, strategies for machining the respective geometric features via subtractive manufacturing, and providing instructions (for example machine tool code, such as CNC code) for causing one or more machine tools to manufacture the object in accordance with the selected strategies. Selecting strategies for machining the respective geometric features via subtractive manufacturing comprises selecting the composite strategy for machining the composite geometric feature.

It will be appreciated that the composite geometric feature need not necessarily comprise a composite material. The word "composite" in "composite geometric feature" instead refers to the fact that the composite geometric feature comprises multiple geometric subfeatures.

The composite geometric feature may for example consist of the plurality of geometric subfeatures. In other words, the plurality of geometric subfeatures may for example together form (or constitute) the composite geometric feature.

It will be appreciated that the composite strategy for machining the composite geometric feature is included in the database in addition to the separate strategies for machining the respective geometric subfeatures.

It will be appreciated that a strategy may be selected via a single selection (such as to select between all available strategies 1, 2, 3, 4 . . . ), or in a sequence of steps (such as to first select a cutting tool, and then select between those of the available strategies which involve use of the selected cutting tool).

The model may for example be a three-dimensional model such as a CAD model.

The method may for example be a computer-implemented method.

The strategies may for example be selected by a digital processor based on input from a human user.

The inventors have realized that that experience and know-how (or knowledge) of CAM programmers, machine tool operators and/or persons knowledgeable in the field of subtractive manufacturing (for example metal cutting) may be collected and codified into strategies for machining different geometric features, for facilitating generation of instructions (such as machine code or computer numerical control, CNC, code) for causing machine tools to manufacture objects via subtractive manufacturing. The use of a database with stored strategies helps the user to get from a model of the object to be machined (such as a CAD model) to instructions for causing one or more machine tools to machine the object, for example taking into account priorities such as part quality, yield, productivity etc. The use of a database with stored strategies may also prevent users from accidentally devising non-working machining strategies which may damage the machine tool, the cutting tool, and/or the object which is manufactured.

It will be appreciated that the strategies stored in the database need not necessarily be complete recipes specifying in detail how to machine the geometric features. The user may for example be allowed to (or even requested to) adapt or complement a selected strategy to suit the current circumstances. The user may for example be prompted to indicate desired cutting data to be employed in a selected strategy. The user may for example be prompted to indicate whether some element of a selected strategy should be changed. Still, compared to the conventional approach which was time-consuming and required plenty of experience, the proposed method reduces the complexity of the task faced by the user. Note also that the conventional approach requires CAM software and CAM programming skills. The proposed method may for example assist a user without CAM experience to arrive from a model of an object to instructions (such as CNC code) for causing one or more machine tools to machine the object. There may for example be no need for use of traditional CAM software.

It will also be appreciated that for a strategy stored in the database, all elements of how to perform the machining do not necessarily need to be predetermined. For example, rather than involving use of predetermined cutting data, the strategy may include a formula or algorithm for determining suitable cutting data based on the circumstances. The cutting data may for example be determined based on a material from which to manufacture the object, a selected cutting tool, a selected tool path, or user preferences indicated via a user interface.

A selected strategy need not necessarily be optimal (for example fastest, or using the lowest number of cutting tools) among all possible strategies for machining the identified feature, but may be an example of a strategy which could be successfully employed for machining the identified geometric feature. Finding the absolute best strategy is practically impossible since the space of theoretically possible strategies for machining a given geometric feature is too large.

The inventors have also realized that while the composite geometric feature could be machined using separate strategies for machining each of its geometric subfeatures, performance with respect to aspects such as productivity (or manufacturing speed), surface quality, and/or tool wear may be improved by using a composite strategy that may take into account the various geometric subfeatures involved and how these are located relative to each other (instead of simply machining one subfeature at a time while ignoring the overall shape of the composite geometric feature). The composite strategy may for example involve machining of two or more geometric subfeatures (or parts of two or more geometric subfeatures) in a combined machining operation using the same cutting tool, rather than machining the geometric subfeatures one at a time using different cutting tools. The composite strategy may for example involve machining of a geometric subfeature in a way which works well (and/or is efficient) in a scenario where the geometric subfeature is part of the composite feature, but which would not be suitable (and/or efficient) in a scenario where the geometric subfeature were part of a differently shaped composite geometric feature.

The ability to select the composite strategy for machining the entire composite geometric feature may also save time compared to selecting separate strategies for machining the geometric subfeatures of the composite geometric feature.

According to some embodiments, the composite strategy may include machining of a geometric subfeature from the plurality of geometric subfeatures in a different way (for example using a different machine tool, a different cutting tool, different cutting data, or a different type tool path pattern) than specified by the separate strategy included in the database for machining that geometric subfeature. In other words, the composite strategy may not merely be a combination of the separate strategies included in the database for machining the geometric subfeatures.

According to some embodiments, identifying the composite geometric feature may comprise identifying the geometric subfeatures, and receiving user input (for example via a human-machine interface, HMI) indicating that the geometric subfeatures form respective portions of a composite geometric feature. The user may for example select which of the identified geometric features to be treated as subfeatures of a composite geometric feature, and which of the identified geometric features to be treated separately when selecting strategies.

According to some embodiments, identifying the composite geometric feature may comprise identifying the geometric subfeatures, and checking in the database whether the identified geometric subfeatures form respective portions of a composite geometric feature (or together form a composite geometric feature) for which a strategy is included in the database. In other words, the database may be employed to select which of the identified geometric features to be treated as subfeatures of a composite geometric feature, and which of the identified geometric features to be treated separately when selecting strategies. The checking in the database may for example be performed autonomously by a computer-implemented algorithm.

According to some embodiments, identifying the composite geometric feature may comprise locating (or finding), in the database, geometric features for which there are strategies included in the database. The located geometric features may include the composite geometric feature. Identifying the composite geometric feature may comprise searching in at least a portion of the model for the composite geometric feature. In other words, if the composite geometric feature (and an associated strategy) is found/located in the database, then the composite geometric feature may be searched for in the model of the object to be manufactured. Geometric features not found/located in the database may for example not be searched for in the model of the object to be machined.

According to some embodiments, identifying the composite geometric feature may comprise illustrating, to a user (for example via a display), the model of the object to be manufactured, receiving user input (for example via a HMI) indicating a selected portion of the model, and locating, in the database, geometric features for which there are strategies included in the database. The located geometric features may include the composite geometric feature. Identifying the composite geometric feature may comprise searching in the selected portion of the model for the composite geometric feature. In other words, if the composite geometric feature (and an associated strategy) is found/located in the database, then the composite geometric feature may be searched for in a portion of the model selected by the user. Geometric features not found/located in the database may for example not be searched for in the model of the object to be machined.

According to some embodiments, identifying a plurality of geometric features to be machined as part of manufacturing the object may comprise illustrating, to a user (for example via a display), the model of the object to be manufactured, receiving user input (for example via a HMI) indicating a selected portion of the model, and identifying a geometric feature in the selected portion of the model.

According to some embodiments, the method may further comprise obtaining user input indicative of one or more prioritized aspects (or factors) of manufacturing of the object. The one or more prioritized aspects may comprise tool life and/or surface quality and/or object manufacturing speed (which may also be referred to as productivity). For a combined strategy obtained by combining the separate strategies for machining the geometric subfeatures, the method may comprise ranking the composite strategy and the combined strategy using the one or more prioritized aspects. The selection of the composite strategy for machining the composite geometric feature may be performed responsive to the composite strategy being ranked higher (in other words, it better matches the one or more prioritized aspects) than the combined strategy. In other words, the composite strategy and the combined strategy are ranked relative to each other using the one or more prioritized aspects. If the composite strategy is ranked higher (in other words, it better matches the one or more prioritized aspects) than the combined strategy, then the composite strategy is selected for machining the composite feature.

According to some embodiments, the method may further comprise, responsive to the combined strategy being ranked higher than the composite strategy, selecting the combined strategy for machining the composite geometric feature. Hence, if the combined strategy is ranked higher (in other words, it better matches the one or more prioritized aspects) than the composite strategy, then the combined strategy may be selected for machining the composite geometric feature.

According to some embodiments, the database may comprise data (which may for example be referred to as priority data) indicating one or more prioritized aspects (such as tool life and/or surface quality and/or object manufacturing speed) associated with the composite strategy and one or more prioritized aspects (such as tool life and/or surface quality and/or object manufacturing speed) associated with the strategies for manufacturing the subfeatures. The ranking of the composite strategy and the combined strategy may be based on that data. Since the data regarding prioritized aspects may be stored in the database, there may for example be no need to analyze the strategies for determining whether they are compatible with the user-indicated one or more prioritized aspects.

The data regarding prioritized aspects for the strategies may for example be retrieved from the database, and may for example be compared with the prioritized aspects indicated by the user input.

The data regarding prioritized aspects for the strategies may for example be stored in the database in addition to the respective strategies.

According to some embodiments, the method may comprise obtaining user input indicative of one or more prioritized aspects of manufacturing of the object. The one or more prioritized aspects may comprise tool life and/or surface quality and/or object manufacturing speed. The method may comprise determining a ranking of the composite strategy with respect to the one or more user-indicated prioritized aspects. In other words, the composite strategy may be evaluated with respect to the user-indicated prioritized aspects to obtain a measure of the level of agreement with respect to these one or more prioritizes aspects. If the ranking of the composite strategy with respect to the one or more prioritized aspects exceeds at threshold (in other word, if the composite strategy is compatible with the one or more prioritized aspects), then the composite geometric feature may be searched for in the model of the object to be manufactured. If the composite strategy is not compatible with the one or more user-indicated prioritized aspect, then there may be no need to search for the composite feature in the model of the object to be manufactured.

According to some embodiments, each of the selected strategies may include one or more cutting tools to be employed for machining a geometric feature, and/or an order in which to machine different parts (or portions) of a geometric feature, and/or cutting data (such as feed rate, and/or cutting speed, and/or depth of cut) for use during machining of a geometric feature, and/or one or more machine tools to be employed for machining a geometric feature.

According to some embodiments, the method may further comprise obtaining a model of a work piece (or of a stock model) from which to manufacture the object. The selection of at least one of the strategies may be based on the model of the work piece, and/or at least one of the selected strategies may be adapted based on the model of the work piece. The model of the work piece may for example be a three-dimensional model, such as a CAD model.

A second aspect provides embodiments of a computer program comprising instructions which, when the instructions are executed by a computer, cause the computer to perform the method of any of the embodiments of the first aspect.

The effects and/or advantages presented above for embodiments of the method according to the first aspect may also apply to corresponding embodiments of the computer program according to the second aspect.

The computer program may for example be provided in a computer program product. In other words, a computer program product may comprise a computer-readable medium with instructions which, when the instructions are executed by a computer (or by a processor comprised in the computer), cause the computer to perform the method of any of the embodiments of the first aspect. The computer-readable medium may for example be a transitory computer-readable medium (such as a signal or wave carrying the instructions from a transmitter to a receiver) or a non-transitory computer-readable medium (such as a storage medium or memory on which the instructions are stored). Further examples of transitory computer-readable media include an electronic signal, an optical signal, and a radio signal.

A third aspect provides embodiments of a system configured to obtain a model of an object to be manufactured via subtractive manufacturing, and identify, based on the model, a plurality of geometric features to be machined as part of manufacturing the object. The plurality of geometric features comprises a composite geometric feature including a plurality of geometric subfeatures. The system is configured to access a database including strategies for machining different geometric features. The database includes a composite strategy for machining the composite geometric feature and separate strategies for machining the respective geometric subfeatures. The system is configured to select, from the strategies included in the database, strategies for machining the respective geometric features via subtractive manufacturing, and provide instructions for causing one or more machine tools to manufacture the object in accordance with the selected strategies. Selecting strategies for machining the respective geometric features via subtractive manufacturing comprises selecting the composite strategy for machining the composite geometric feature. In other words, the system is configured to select the composite strategy for machining the composite geometric feature.

The system may for example comprise one or more processors configured to perform the method as defined in any of the embodiments of the first aspect. The system may for example comprise one or more storage media with instructions for causing the one or more processors to perform the method as defined in any of the embodiments of the first aspect.

The system may for example comprise the database.

The system may for example comprise a user interface (for example a HMI) for receiving the user instructions.

The system may for example comprise a display (or screen) for presenting information to a user. The display may for example be employed to show data to the user that provides insight into how the system is making decisions.

The system may for example comprise a machine code generator configured to generate the instructions for causing one or more available machine tools to manufacture the object via subtractive manufacturing.

The system may for example comprise one or more available machine tools, and/or one or more available cuttings tools, and/or one or more available fixtures for holding a work piece.

The system may for example be comprised in a machine tool, such as a CNC machine tool.

The effects and/or advantages presented above for embodiments of the method according to the first aspect may also apply to corresponding embodiments of the system according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Figure 1:
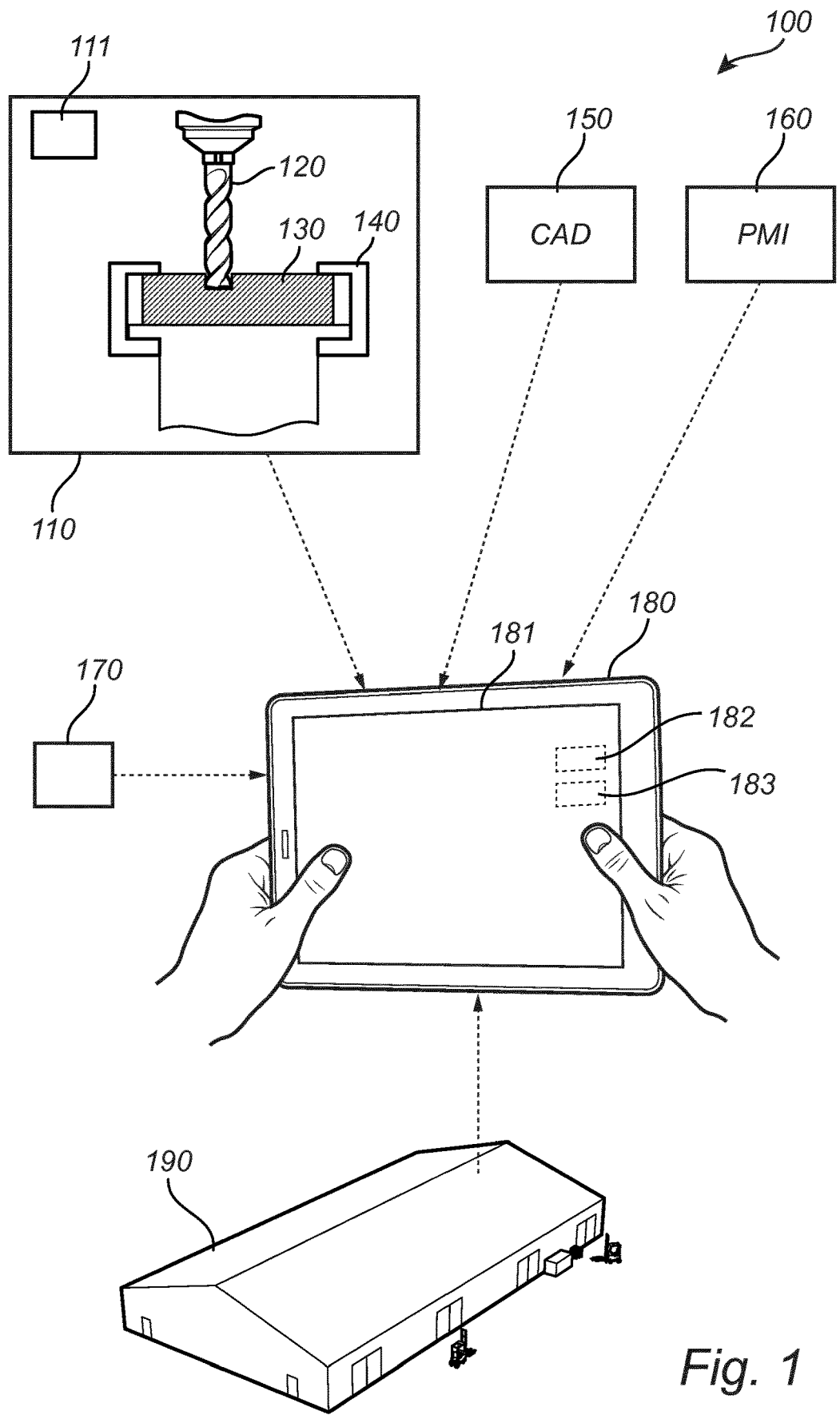
FIG. 1 is a schematic overview of an example machining site and associated equipment.

FIG. 1 is a schematic overview of a machining site 100 and associated equipment. One or more machine tools 110 are arranged at the machining site 100 for performing subtractive manufacturing. The machine tools 110 may for example be adapted for metal cutting. The machine tools 110 may be adapted to perform machining operations, for example metal cutting operations, such as drilling, milling, turning, reaming, or threading. A machine tool database may for example be employed to keep track of the available machine tools 110.

One or more cutting tools 120 are available for use by the machine tools 110 to perform machining operations where a cutting tool 120 moves relative to a work piece 130 for cutting away material from the work piece 130. Cutting tools 120 available for use by a machine tool 110 may for example be arranged in a tool magazine (not shown) from which the cutting tools 120 may be fed into position in the machine tool 110 to replace the previously used cutting tool 120. The cutting tools 120 may for example be replaced by a robotic arrangement or may be replaced manually. A cutting tool database may for example be employed to keep track of the available cutting tools 120. The cutting tools 110 may be available directly at the machining site 100, or in a warehouse 190 from which they may be retrieved.

The cutting tools 120 may include general purpose cutting tools as well as cutting tools specifically adapted for cutting in certain materials or for cutting certain shapes. Some of the cutting tools 120 may be solid cutting tools formed in a single piece of material such as steel or cemented carbide. Some of the cutting tools 120 may consist of multiple pieces fitted together to form the cutting tool. Some of the cutting tools 120 may for example be equipped with replaceable cutting inserts (not shown). The cutting inserts may for example comprise cemented carbide or ceramic material, and may for example be provided with various coatings for meeting user requirements. The coatings may for example be adapted for cutting in certain materials, and/or may be adapted for improving heat resistance and/or wear resistance. One or more fixtures 140 are available for holding the work piece 130 in position during the machining. Fixtures 140 available for use by a machine tool 110 may for example be stored in a vicinity of the machine tool 110 so that the fixtures 140 may be retrieved when needed to replace the currently employed fixture 140. The fixtures 140 may for example be replaced by a robotic arrangement or may be replaced manually.

It will be appreciated that the fixture 140 depicted in FIG. 1 is an example, and that many other types of fixtures may be envisaged.

The machine tools 110 may be equipped with cooling systems (not shown) for providing cooling during machining. The cooling may for example be provided via a cooling fluid.

The machine tools 110 are equipped with control systems 111 for controlling the machine tools 110. The control system 111 of a machine tool 110 may for example control servos of the machine tool 110 for moving the cutting tool 120 relative to the work piece 130. In some machine tools 110, the control system 111 may cause both the cutting tool 120 and the work piece 130 to move. The machine tools 110 may for example be computer numerically controlled (CNC) machine tools 110, and the control system 111 may be adapted to execute CNC code.

An object to be manufactured is defined by a model 150, such as a three-dimensional CAD model 150. Tolerances for the object regarding shape accuracy, geometric dimensions and/or surface finish may be specified via product and manufacturing information (PMI) 160. The PMI 160 may also specify the material to be employed to manufacture the object.

For the machine tools 110 to be able to manufacture the object in accordance with the model 150 and the PMI 160, appropriate instructions need to be generated for the control systems 111 of the machine tools 110.

Generation of such instructions is a complicated task involving selection of for example operation sequences (for example in which order to perform different operation steps such as facing, hole making, and threading), machine tools 110, cutting tools 120, fixtures 140, and cutting data (such as feed rate, cutting speed, and depth of cut). These factors affect the quality and precision of the manufactured object, and may also affect the manufacturing time and/or wear on the cutting tools. Hence, generation of suitable instructions for the control system 111 usually involves plenty of trial and error, even for experienced people.

However, persons knowledgeable in the field of subtractive manufacturing, and companies with extensive experience in developing cutting tools, have collected plenty of knowledge over time regarding how to machine different geometric features. This knowledge may be codified and stored as strategies in a database 170. The database 170 includes strategies for machining different geometric features. The database 170 may also include different strategies for machining a certain geometric feature depending on the material of the work piece 130.

Figure 2:
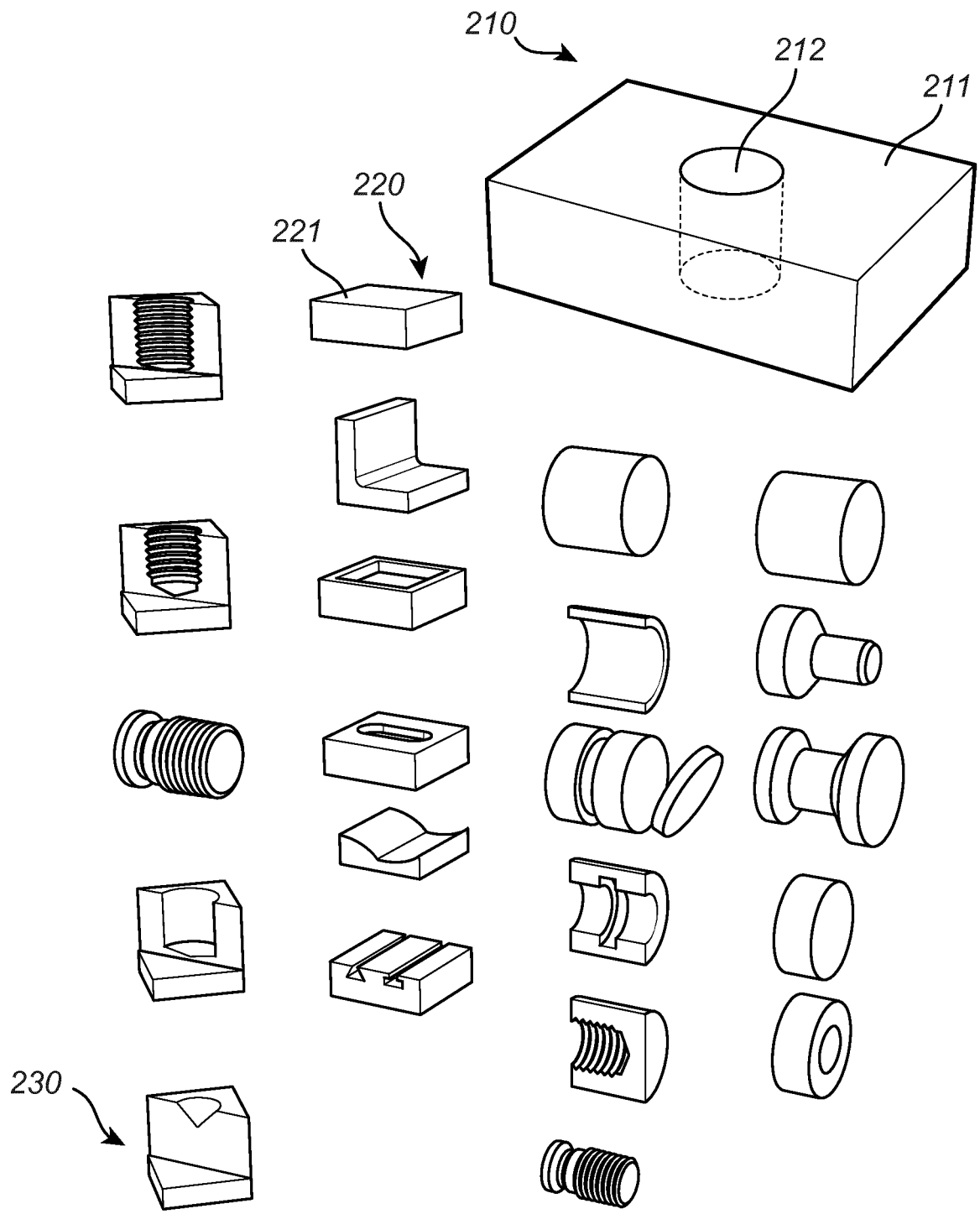
FIG. 2 shows perspective views of example geometric features for which strategies may be stored in a database.

FIG. 2 shows perspective views of example geometric features for which associated strategies are included in the database 170. The geometric features covered by the database 170 may for example include a collection of common features which may have relatively simple geometries. The geometric features covered by the database 170 may also include more complicated features having several subfeatures such as holes or threads. Even quite complicated features may be included in the database 170, as long as suitable strategies for manufacturing them have been devised.

For a given object to be manufactured, geometric features to be machined as part of manufacturing the object may first be identified. The database 170 may then be employed to find strategies for machining the identified geometric features.

Although strategies for many geometric features may have been stored in the database 170, there may of course be some features lacking entries in the database 170. The database 170 may therefore be built up over time to cover even more geometric feature (or shapes) as new strategies are figured out by people in the technical field.

For some or all of the geometric features, the database 170 may include a plurality of strategies defining different ways of machining the same geometric feature. Strategies may therefore be selected from the database based on the current circumstances.

FIG. 2 shows an object 210 having several flat surfaces 211 and a hole 212 with an opening in the top surface 211. A first example geometric feature to be machined may consist of the upper flat surface 211 and the hole 212. In other words, the first example geometric feature has two subfeatures 211 and 212. In a first strategy for machining the geometric feature, the hole 212 is machined first, and the surface 211 is machined afterwards. In a second strategy, the surface 211 is machined first, and the hole 212 is machined afterwards.

Drilling of the hole 212 after forming the surface 211 (as in the second strategy) may cause deformations (or damage) at the surface 211 close to where the drill enters the hole 212. Forming the surface 211 after drilling the hole 212 (as in the first strategy) may cause deformation in the hole 212 close to the surface 211. Whether the deformations caused by the respective strategies are acceptable may depend on the tolerances specified for the object to be manufactured, but also on the cutting tools available for performing the machining. Some drills may for example cause more deformations to the surface 211 than others, so that an additional machining operation is required to remove the deformations caused by the drilling. In such cases, the first strategy (machining the hole 212 first) may be more suitable than the second strategy (machining the surface 211 first). Selection of a suitable strategy from the database 170 may therefore be based on the available cutting tools.

Another factor that may affect the selection between the first and second strategies is bending of the drill employed to make the hole 212, which may affect precision. Machining of the surface 211 first reduces the depth of the hole 212 to be drilled, which may affect how much the drill may bend.

Further, if the available drills are short, it may be desirable to employ the second strategy (machining the surface 211 first), since machining of the surface 211 first reduces the depth of the hole 212 to be drilled so that the drill reaches far enough to make the hole.

Figure 3:
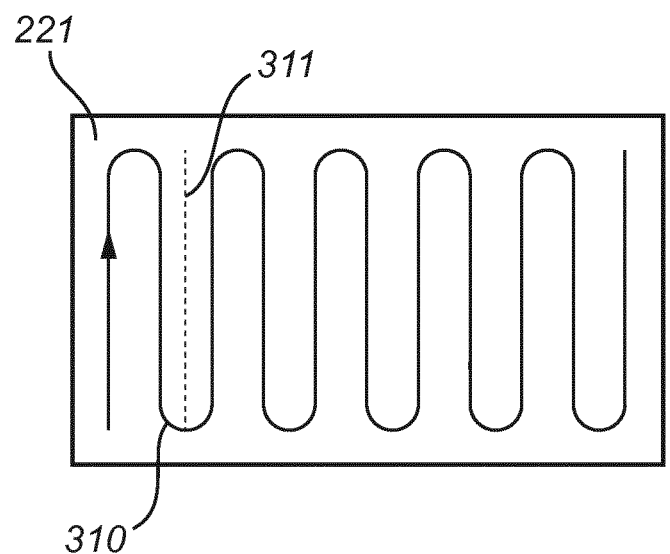
FIG. 3 shows two different examples of types of tool path patterns for machining the same geometric feature.
Figure 3:
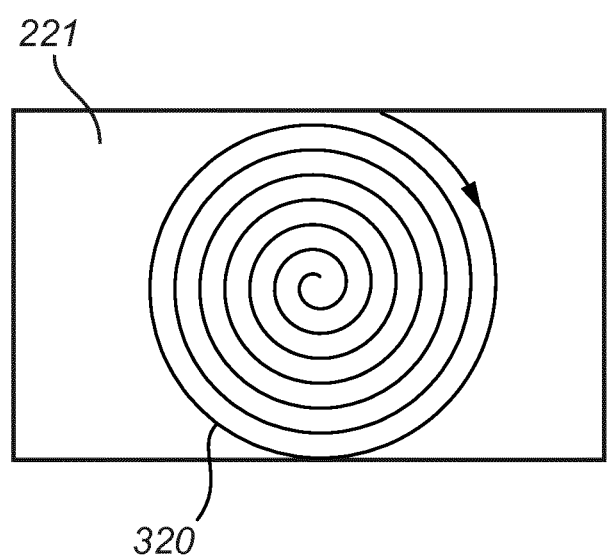

A second example geometric feature is the flat upper surface 221 of the object 220 shown in FIG. 2. FIG. 3 shows two examples of different types of tool path patterns which could be employed for machining the geometric feature 221.

FIG. 3 shows the example feature 221 from above. A first strategy for machining the feature 221 employs a type of tool path pattern 310 where the cutting tool 120 passes back and forth across the surface 221. A second strategy for machining the feature 221 employs a type of tool path pattern 320 where the cutting tool 120 spirals inwards towards the center of the surface 221.

It will be appreciated that the tool path patterns shown in FIG. 3 are schematic, and that the spiral-shaped tool path pattern 320 may for example be larger so that it covers the entire surface 221.

The first tool path pattern 310 is rather simple and convenient to use. However, the fact that the cutting tool 120 moves back and forth means that it passes the area along the dotted line 311 in different directions at the respective sides of the line 311, which may cause undesired roughness or uneven areas along the dotted line 311 when certain cutting tools are employed. The selected strategy may also have a negative influence on tool life or may in some cases cause tool breakage.

The second tool path pattern 320 allows the cutting tool 120 to perform cutting in a more uniform way along the tool path (compared to the first tool path pattern 310 where the cutting tool 120 may pass in and out of cut). The second tool path pattern 320 does not suffer from the potential problems associated with the first tool path pattern 310, and may therefore be preferable for some cutting tools 120. Selection of a suitable strategy from the database 170 may therefore be based on the available cutting tools 120.

Note that the number of passes back and forth over the surface 221 in the first tool path pattern 310 may be adapted based on the size of the available cutting tool 120. If a milling cutter with small diameter is employed, then a large number of passes may be needed. If a milling cutter with larger diameter is employed, then a smaller number of passes may be employed. This may for example affect the manufacturing time and/or tool wear.

The example strategies described above with reference to FIGS. 2 and 3 are relatively simple since they relate to relatively simple shapes 210 and 220. It will be appreciated that strategies for machining more complicated geometric features (such as the example feature 230 shown in FIG. 2) are typically more complicated. The skilled person realizes that strategies for machining more complicated geometric features may for example involve several different machining operations using different cutting tools and several different types of tool path patterns. Machining of some geometric features may for example include steps such as roughing, semi-finishing and finishing. Each of these steps may for example include several machining operations. The skilled person also realizes that a single strategy may include several machining operations performed by different machine tools 110. By selecting between different strategies, one may not only influence the order in which machining operations are performed, but also the order in which the different machine tools 110 are employed.

It will be appreciated that the database 170 may include strategies for machining many more geometric features than those shown in FIG. 2. It will also be appreciated that the tool path patterns 310 and 320 described above with reference to FIG. 3 are only intended as simple examples, and that other tool path patterns (for example including tool paths in three dimensions rather than tool paths in a plane as in FIG. 3) may also be envisaged.

It will also be appreciated that while a strategy may be associated with a certain type of tool path pattern, the strategy need not include the actual tool paths to be employed. The actual tool paths to be employed for the manufacturing may for example be generated after strategies have been selected for all of the geometric features to be machined. The tool paths may for example be generated by a computer-implemented algorithm based on the strategies selected for the geometric features to be machined.

A system 180 is adapted to generate instructions for causing the machine tools 110 to manufacture the object defined by the model 150 and the PMI 160. The system 180 is equipped with a user interface 181 for user interaction. The user interface 181 may for example be a human machine interface (HMI). The HMI may for example include a touch screen 181 and one or more keys or buttons. The system 180 is adapted to select strategies from the database 170 and to generate instructions for the machine tools 110. Such tasks may for example be performed by one or more processors 182. The processors 182 may for example be digital processors.

The system 180 may for example be located at the machining site 100 in the form of a stationary or portable computer device with embedded/standalone human machine interface (HMI) with communication possibility, e.g. a tablet computer or a smart phone, equipped with suitable software. In other embodiments, the system 180 may for example be integrated as a part of one or more of the machine tools 110. Alternatively, the system 180 may be arranged at a remote location, or may be enabled on another suitable platform, e.g., cloud-based technology with possibility to communicate, compute, storage and deployment of software in a secure and efficient manner. In a preferred embodiment, the system 180 is implemented as a software application running on a tablet computer.

A database 170 communicatively coupled to the system 180 and including e.g. a machine tool database and/or cutting tool database and/or a strategy database and/or a model database and/or a PMI database may for example be employed to keep track of the available machine tools 110. The database 170 may be implemented in local memory of the system 180 or as network based storage, e.g. a server or virtual/cloud server storage.

The system 180 may for example comprise the database 170. Embodiments may also be envisaged in which the database 170 is arranged at a remote location, or in which the database 170 is cloud-based. In a preferred embodiment, the system 180 is implemented as a software application running on a tablet computer.

Figure 4:
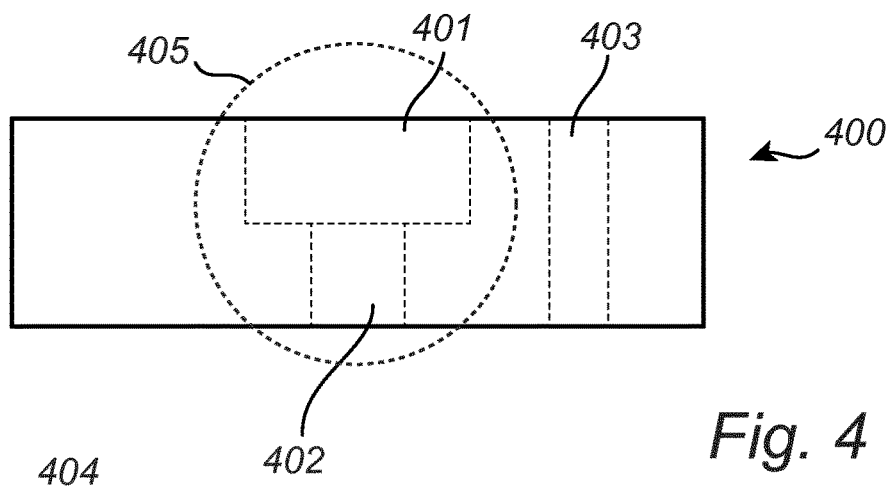
FIG. 4 is side view of an example object to be manufactured.
Figure 5:
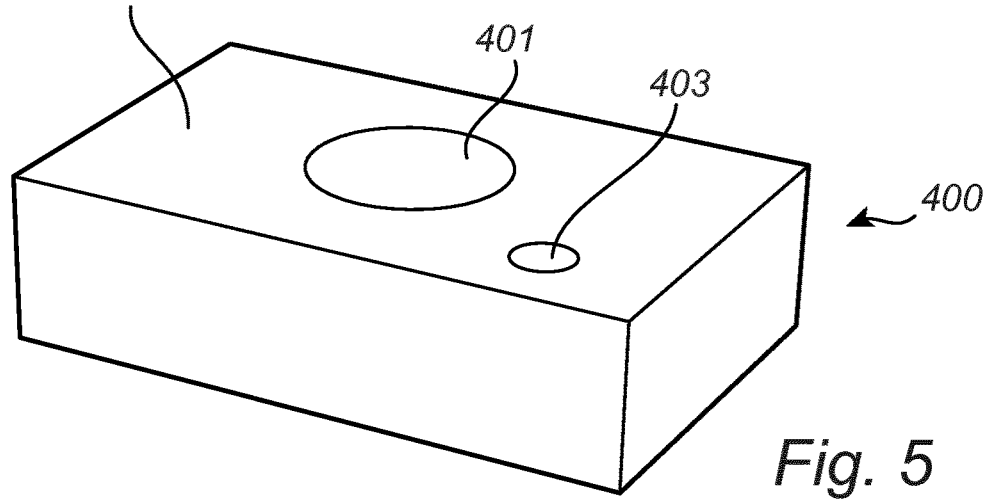
FIG. 5 is a perspective view of the object from FIG. 4.
Figure 6:
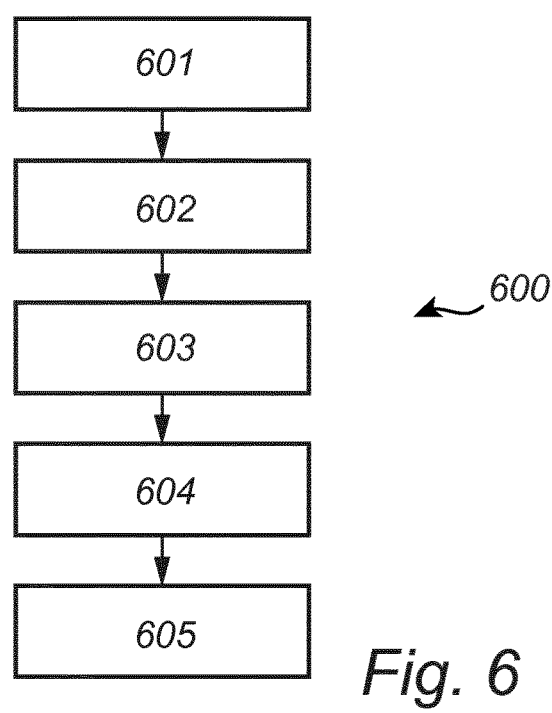
FIG. 6 is a flow chart of a method performed by a system shown in FIG. 1, according to an embodiment.

Operation of the system 180 will now be described with reference to FIGS. 4-6. FIG. 6 is a flow chart of a method 600 performed by the system 180, according to an embodiment. FIG. 4 is side view of an example object 400 to be manufactured, and FIG. 5 is a perspective view of the example object 400 from FIG. 4. The object 400 has a first hole 401 and a second hole 402 located at the bottom of the first hole 401. The second hole 402 is a through hole and has a smaller diameter than the first hole 401. The object 400 also has a third hole 403. Both the first hole 401 and the third hole 403 have openings in an upper surface 404 of the object. The three holes 401, 402 and 403, and the upper surface 404 are geometric features of the object 400. However, the first hole 401 and the second hole 402 may be regarded as geometric subfeatures of a composite geometric feature 405. In other words, the composite geometric feature 405 consists of the two holes 401 and 402. The method 600 will be described below with reference to the example object 400. However, it will be appreciated that the object 400 merely serves as an example, and that the method 600 may be applied just as well for many other types of objects (for example more complex objects having even more geometric features).

In a first step of the method 600, the model 150 of the object 400 to be manufactured via subtractive manufacturing is obtained 601. In the present embodiment, the model 150 is a computer-aided design (CAD) model generated by a component designer at a remote computer, and the CAD model is received by the system 180. However, embodiments may also be envisaged in which the CAD model 150 is generated by the system 180, or by a user of the system 180. The PMI 160 may for example be obtained with the CAD model 150.

A plurality of geometric features to be machined as part of manufacturing the object 400 is then identified 602 based on the model 150. An identified geometric feature may for example constitute a portion of the object to be manufactured, or may be an intermediate shape to be machined before the final shape of the object may be machined. The identification 602 of geometric features may for example be performed automatically via a computer algorithm. Several schemes for such automatic detection of geometric features (also referred to as feature recognition) are known in the art, and such schemes are therefore not described further herein. However, various schemes for detecting a composite geometric feature will be describe below with reference to FIGS. 7-9. Some of those schemes involve user interaction.

The plurality of identified geometric features comprises a composite geometric feature including a plurality of geometric subfeatures. In the present example, the composite geometric feature 405 is formed by the first hole 401 and the second hole 402, which may be regarded as subfeatures of the composite geometric feature 405. The plurality of identified geometric features also comprises the third hole 403 and the upper surface 404.

The database 170 is then accessed 603. The database 170 includes strategies for machining different geometric features. The database 170 includes a composite strategy for machining the composite geometric feature 405 and separate strategies for machining the geometric subfeatures 401 and 402.

From among the strategies stored in the database 170, strategies are then selected 604 for machining the identified geometric features via subtractive manufacturing. The step of selecting 604 strategies includes selecting the composite strategy for machining the composite geometric feature 605. In the present example, this corresponds to using a stored composite strategy for machining the composite geometric feature 405 rather than using a separate stored strategy for machining the first hole 401 and then using a separate stored strategy for machining the second hole 402.

In a first example scenario, the database 170 includes a first drilling strategy for making the first hole 401 with a certain depth using a drill of a large diameter, and a second drilling strategy for making the second hole 402 (which is a through hole) using a drill of smaller diameter. Machining of the composite geometric feature 405 using these two separate strategies would require the cutting tool (in this case the drill) to be replaced after drilling the first hole 401, since a drill with a smaller diameter is needed for the making the second hole 402. In at least some cases, this may be regarded as inefficient. A composite strategy is therefore stored in the database 170 for milling the composite geometric feature 405. The composite strategy includes use of a suitable milling tool for machine the entire composite feature 405, including the first hole 401 and the second hole 402. In the present example scenario, the composite strategy allows the composite feature 405 to be machined without changing cutting tool (instead of having to use to different drills).

In a second example scenario, the database 170 includes a first milling strategy for making the first hole 401 with certain depth and a large diameter, and a second milling strategy for making the second hole 402, which is a through hole with a smaller diameter. Even if these two milling strategies employ the same milling tool, the first milling strategy may cause the milling tool to retract from the first hole 401 before the second milling strategy is initiated for making the second hole 402. Indeed, the first milling strategy does not take into account what will happen after it has been completed, and therefore does not exploit the fact that the second hole 402 is located at the bottom of the first hole 401. Therefore, a composite strategy for machining the composite geometric feature 405 is stored in the database 170 for making sure that the specific shape of the composite feature 405 is exploited. In the present example scenario, the composite strategy causes the milling tool to stay in the in the first hole 401 when the first hole 402 has been finished, so that it can continue immediately with the second hole 402 located at the bottom of the first hole 401. The composite strategy may therefore save time compared to the separate strategies stored for the first hole 401 and second hole 402.

As illustrated by the two example scenarios described above, it may be advantageous to employ a composite strategy for machining a composite geometric feature, as long as such a strategy is available in the database 170. If no such composite strategy is available in the database 170 (or as described below with reference to FIGS. 10-11, the stored composite strategy is not compatible with user-indicated priorities), the system 180 may instead employ separate strategies stored in the database 170 for machining the respective subfeatures of the composite geometric feature.

In general, a strategy selected from the database 170 may for example include:
  a sequence of operations including for example facing, hole-making, and threading;
  one or more machine tools 110 for performing the manufacturing;
  one or more cutting tools 120 for use by the one or more machine tools 110,
  one or more fixtures 140 for holding a work piece 130; and
  a type of tool path pattern for the one or more cutting tools 110.

A selected strategy may also include use of cooling fluids for providing cooling during the machining.

A selected strategy may also include means for determining suitable cutting data (such as feed rate, cutting speed, and depth of cut) based on the circumstances. The cutting data may for example be determined based on the material of the work piece 130, the tolerance set by the PMI 160, a selected type of tool path pattern, and a selected cutting tool 120.

Instructions for causing one or more machine tools 110 to manufacture the object in accordance with the selected 604 strategies are then provided 605. The system 180 may for example comprise a machine code generator 183 (or CNC code generator) for generating the instructions for the machine tool 110 (or the instructions may be generated by the one or more processors 182). The instructions for the machine tool 110 may for example be provided in the form of CNC code.

In an example scenario, the generated 605 instructions are then provided directly to the machine tool 110 via a wired or wireless connection. In another example scenario, the generated 605 instructions are provided from the system 180 to the machine tool 110 via the internet or via a cloud-based service. The machine tool 110 then manufactures the object via subtractive manufacturing in accordance with the received instructions. In another scenario, the system 180 is integrated as a part of the machine tool 110 itself.

Figure 7:
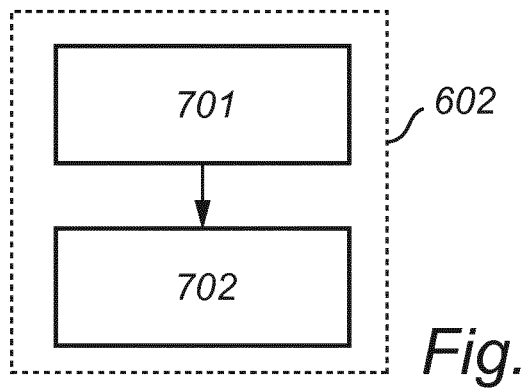
FIGS. 7-9 are flow charts of example schemes for how a composite geometric feature may be selected in the method from FIG. 6.

FIG. 7 is a flow chart of a first example scheme for how a composite geometric feature may be identified in the method 600 from FIG. 6. In the present example scheme, the step of identifying 602 the composite geometric feature 405 comprises:
  identifying 701 the geometric subfeatures 401 and 402; and
  receiving 702 user input indicating that the geometric subfeatures 401 and 402 form respective portions of a composite geometric feature 405.

For example, the subfeatures 401 and 402 may be automatically detected by the system 180 via a feature detection (or recognition) algorithm, but the system 180 may be unable to detect the composite geometric feature 405. Therefore, the user indicates via a HMI 181 (for example by clicking at the features 401 and 402 on a touch screen 181) that the subfeatures 401 and 402 together form a composite geometric feature 405 for which there may be composite strategies stored in the database 170.

Figure 8:
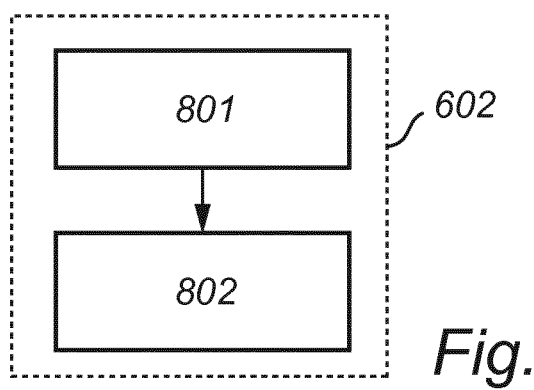

FIG. 8 is a flow chart of a second example scheme for how a composite geometric feature may be identified in the method 600 from FIG. 6. In the present example scheme, the step of identifying 602 the composite geometric feature 405 comprises:

identifying 801 the geometric subfeatures 401 and 402; and checking 802 in the database 170 whether the identified geometric subfeatures 401 and 402 form respective portions of a composite geometric feature 405 for which a strategy is included in the database 170.

For example, the subfeatures 401 and 402 may be automatically detected by the system 180 via a feature recognition algorithm, and the system 180 is also able to use the database 170 to detect the composite geometric feature 405. More specifically, the system 180 accesses 802 the database 170 to see which composite geometric features are included there, and whether any of those consist of subfeatures detected in the model 150 of the object 400 to be manufactured. In the present example scenario, the system 180 is able to detect the composite geometric feature without assistance from the user.

Figure 9:
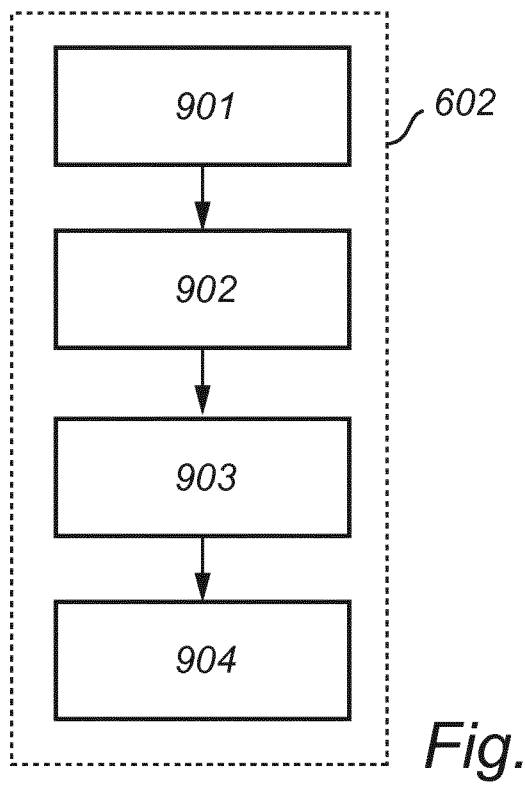

FIG. 9 is a flow chart of a third example scheme for how a composite geometric feature may be identified in the method 600 from FIG. 6. In the present example scheme the step of identifying 602 the composite geometric feature 405 comprises:

illustrating 901, to a user, the model 150 of the object 400 to be manufactured;

receiving 902 user input indicating a selected portion of the model 150;

locating 903, in the database 170, geometric features for which there are strategies included in the database, the located geometric features including the composite geometric feature 405; and searching 904 in the selected portion of the model 150 for the composite geometric feature 405.

In other words, the user indicates (for example via a HMI 181) where in the model 150 a geometric feature is to be detected. The system 180 then employs a feature detection algorithm to detect geometric features in the indicated region/portion of the model 150. The feature detection algorithm employs the database 170 to know which types of geometric features to look for when trying to detect features in the model 150. In the present example scenario, the user is involved in the feature detection, but the user only needs to indicate where a feature is to be detected, and then the system 180 can perform the feature detection, even for composite geometric features.

Figure 10:
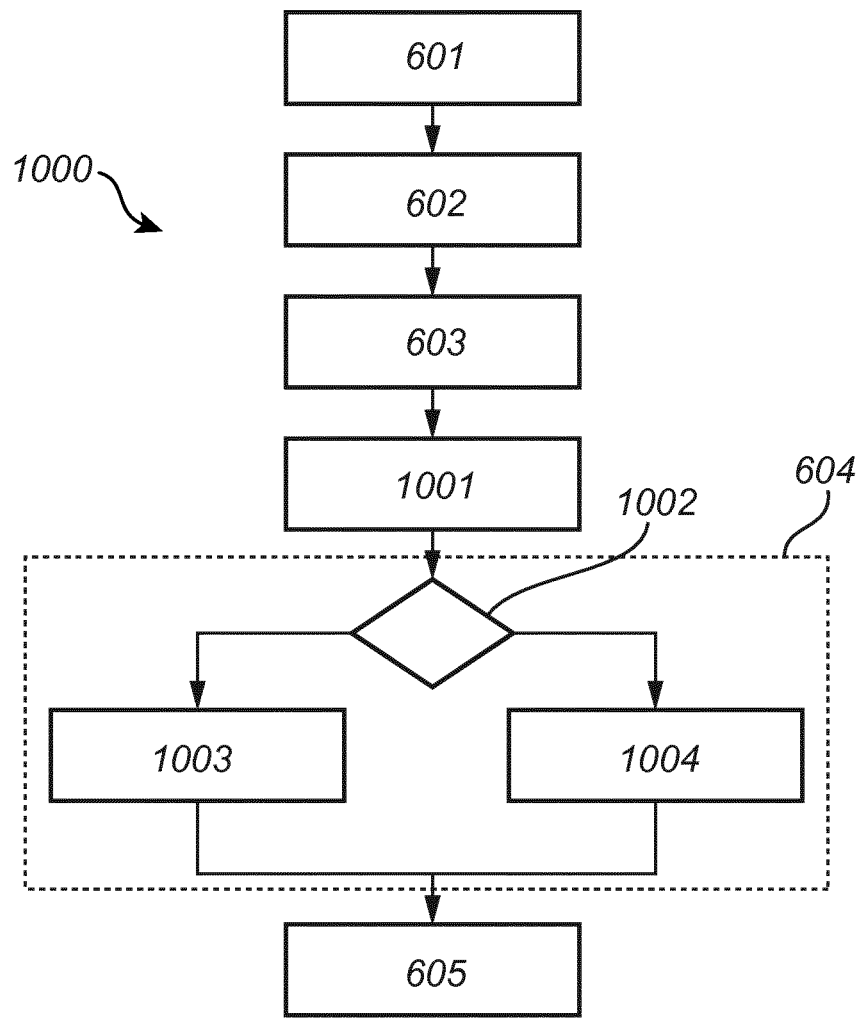
FIG. 10 is a flow chart of a method similar to the method shown FIG. 6, but where user input is provided regarding prioritized aspects of the machining, according to an embodiment.

FIG. 10 is a flow chart of a method 1000 similar to the method 600 from FIG. 6, but where the user provides input to the system 180 regarding prioritized aspects of the machining, according to an embodiment.

In the method 1000, the system 180 obtains 1001 user input (for example via a HMI 181) which indicates one or more prioritized aspects of the manufacturing. The system 180 may for example ask the user to select whether tool life, surface quality, or object manufacturing speed should be prioritized. In one embodiment, the user input may be indicative of relative importance of the prioritized aspects of manufacturing of the object. In one example, an indication of a high number for tool life and indications of low numbers for surface quality and/or object manufacturing speed indicate that tool life is the most prioritized aspect of manufacturing the object. Indication of numbers may be performed by the user checking tick-boxes, moving sliders, pressing keys or in any other way interacting via a HMI 181.

The method 1000 then compares 1002 the stored composite strategy for machining the composite geometric feature 405 to a combined strategy obtained by combining the separate stored strategies for machining the geometric subfeatures 401 and 402. The comparison 1002 is made with respect to the user-indicated priority (tool life, surface quality, or object manufacturing speed), so as to obtain a relative ranking 1002 between the composite strategy and the combined strategy. If the composite strategy is ranked higher than the combined strategy, then the composite strategy is selected 1003 for machining the composite geometric feature 405. If, on the other hand, the combined strategy is ranked higher than the composite strategy, then the combined strategy is selected 1004 for machining the composite geometric feature 405.

Figure 11:
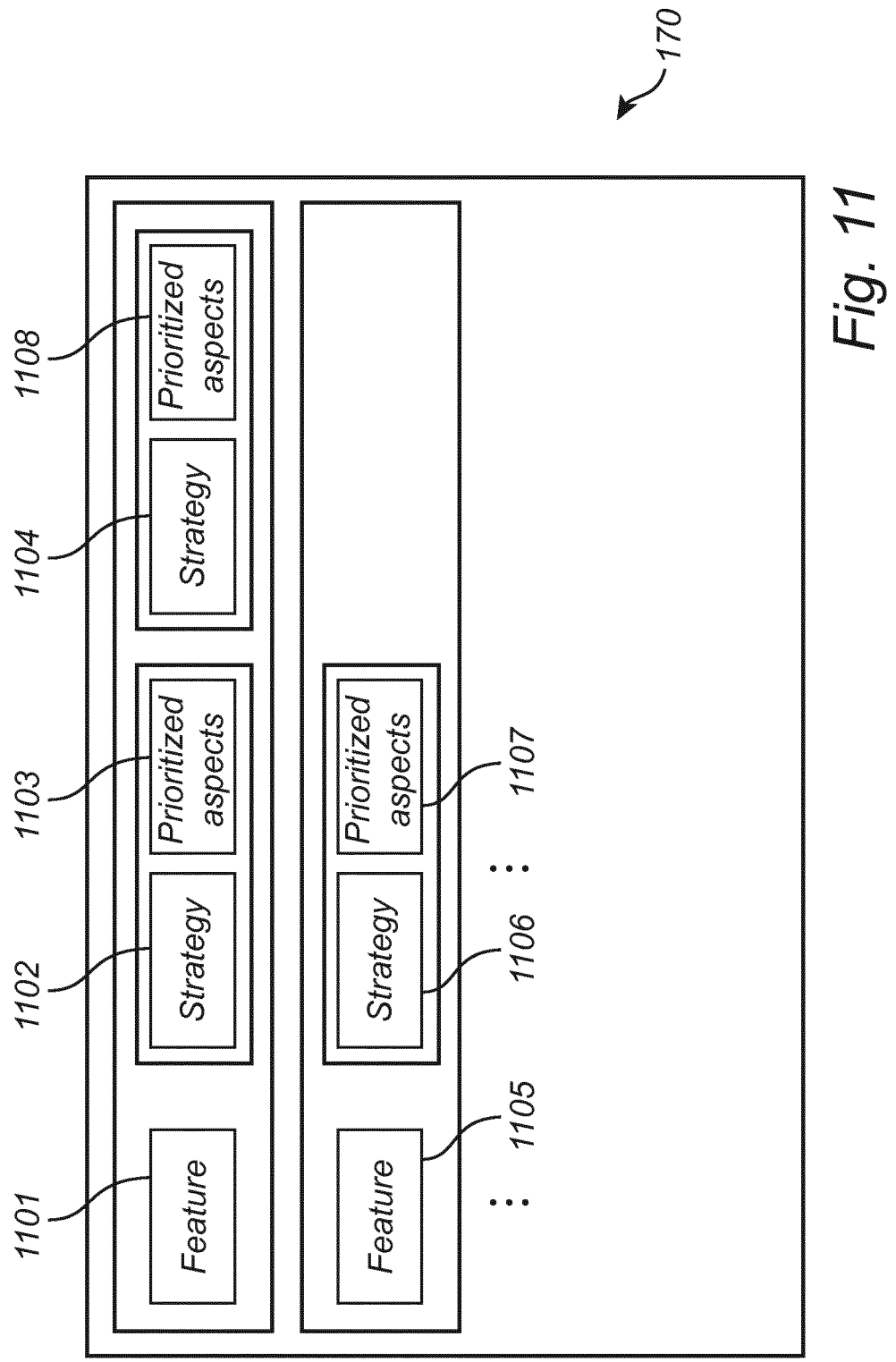
FIG. 11 is a schematic overview of an example database from which strategies may be selected.

In some embodiments, dedicated data is stored in the database 170 for assisting the ranking 1002. FIG. 11 is a schematic overview of such an example database 170. The database 170 includes different geometric features (exemplified herein by the two features 1101 and 1105). For each geometric feature in the database 170, the database 170 includes one or more associated strategies (exemplified herein by the strategies 1102 and 1104 for the feature 1101 and the strategy 1106 for the feature 1105). For each of the strategies in the database 170, the database 170 includes dedicated data for indicating whether the strategy is preferable with regard to manufacturing speed, tool life and/or surface quality (exemplified herein by the dedicated data 1103 for the strategy 1102, the dedicated data 1108 for the strategy 1104, and the dedicated data 1107 for the strategy 1106).

In an example scenario, the database 170 comprises data indicating a prioritized aspect (manufacturing speed) associated with the composite strategy for machining the composite geometric feature 405 and prioritized aspects (surface quality) associated with the separate strategies for machining the geometric subfeatures 401 and 402. If the obtained 1001 user input indicates that manufacturing speed is prioritized, then the composite strategy is ranked highest and will be selected 1003 for manufacturing the composite geometric feature 405. If, on the other hand, the obtained 1001 user input indicates that surface quality is prioritized, then the separate strategies for machining the holes 401 and 402 will be ranked highest and will be selected 1004 for manufacturing the composite geometric feature 405.

The person skilled in the art realizes that the present invention is by no means limited to the preferred embodiments described above. On the contrary, many modifications and variations are possible within the scope of the appended claims. For example, many different geometric features than those shown in FIG. 2 and FIG. 11 may be covered by the database 170. Further, it will be appreciated that the tool path patterns shown in FIG. 3 merely serve as examples, and that many other types of tool path patterns may be envisaged. It will be appreciated that the machining site 100 depicted in FIG. 1 is a simplified example. For example, FIG. 1 only shows a single machine tool 110, a single cutting tool 120, and a single fixture 140, while a real machining site may typically include several available machine tools 110, cutting tools 120, and fixtures 140. It will also be appreciated that the methods described above with reference to FIGS. 6-11 may be employed for other objects than the example object 400 described above with reference to FIGS. 4-5.

It will be appreciated that a processor 182 (or processing circuitry) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

It will also be appreciated that a user of the system 180 may provide user input by checking tick-boxes, moving sliders, pressing keys or in any other way interacting via the HMI 181.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method comprising:
    obtaining a model of an object to be manufactured via subtractive manufacturing;
    identifying, based on the model, a plurality of geometric features to be machined as part of manufacturing the object, wherein the plurality of geometric features includes a composite geometric feature including a plurality of geometric subfeatures;
    accessing a database including strategies for machining different geometric features of the plurality of geometric features, wherein the database includes a composite strategy for machining the composite geometric feature and separate strategies for machining the respective geometric subfeatures, wherein the database includes data indicating one or more prioritized aspects associated with the composite strategy and the one or more prioritized aspects associated with the strategies for manufacturing the subfeatures;
    obtaining user input indicative of the one or more prioritized aspects of manufacturing of the object, the one or more prioritized aspects including tool life, surface quality, or object manufacturing speed;
    comparing a combined strategy obtained by combining the separate strategies for machining the geometric subfeatures to the composite strategy using the one or more prioritized aspects, so as to obtain a relative ranking between the composite strategy and the combined strategy, wherein the ranking of the composite strategy and the combined strategy is based on said data;
    selecting, from the strategies included in the database, strategies for machining the respective geometric features via the subtractive manufacturing, wherein selecting the composite strategy for machining the composite geometric feature is performed responsive to the composite strategy being ranked higher than the combined strategy;
    responsive to the combined strategy being ranked higher than the composite strategy, selecting the combined strategy for machining the composite geometric feature; and
    providing instructions for causing one or more machine tools to manufacture the object in accordance with the selected strategies, wherein the selecting of the strategies, from the strategies included in the database, for machining the respective geometric features via the subtractive manufacturing comprises selecting the composite strategy or the combined strategy for machining the composite geometric feature.

2. The method of claim 1, wherein the composite strategy includes machining of a geometric subfeature from said plurality of geometric subfeatures in a different way than specified by the separate strategies included in the database for machining that geometric subfeature.

3. The method of claim 1, wherein identifying the composite geometric feature comprises:
    identifying the geometric subfeatures; and
    receiving second user input indicating that the geometric subfeatures form respective portions of the composite geometric feature.

4. The method of claim 1, wherein identifying the composite geometric feature comprises:
    identifying the geometric subfeatures; and
    checking in the database whether the identified geometric subfeatures form respective portions of the composite geometric feature for which a strategy of the strategies is included in the database.

5. The method of claim 1, wherein identifying the composite geometric feature comprises:
    locating, in the database, geometric features of the plurality of geometric features for which there are strategies of the strategies included in the database, the located geometric features including the composite geometric feature; and
    searching in at least a portion of a model for the composite geometric feature.

6. The method of claim 1, wherein identifying the composite geometric feature comprises:
    illustrating, to a user, the model of the object to be manufactured;
    receiving third user input indicating a selected portion of the model;
    locating, in the database, geometric features of the plurality of geometric features for which there are strategies of the strategies included in the database, the located geometric features including the composite geometric feature; and
    searching in the selected portion of the model for the composite geometric feature.

7. The method of claim 1, wherein identifying the plurality of geometric features to be machined as part of the manufacturing the object comprises:
    illustrating, to a user, the model of the object to be manufactured;
    receiving fourth user input indicating a selected portion of the model; and
    identifying a geometric feature of the plurality of geometric features in the selected portion of the model.

8. The method of claim 5, further comprising:
    obtaining fifth user input indicative of the one or more prioritized aspects of manufacturing of the object; and determining a second ranking of the composite strategy with respect to the one or more prioritized aspects, wherein the searching for the composite geometric feature is performed in response to the second ranking of the composite strategy with respect to the one or more prioritized aspects exceeding a threshold.

9. The method of claim 1, wherein each of the selected strategies includes one or more cutting tools to be employed for machining a geometric feature of the plurality of geometric features; and/or an order in which to machine different parts of a geometric feature of the plurality of geometric features; and/or cutting data for use during machining of a geometric feature of the plurality of geometric features; and/or one or more machine tools to be employed for machining a geometric feature of the plurality of geometric features.

10. A computer program comprising instructions which, when the instructions are executed by a computer, cause the computer to perform the method of claim 1.

11. A system configured to:
obtain a model of an object to be manufactured via subtractive manufacturing;
identify, based on the model, a plurality of geometric features to be machined as part of manufacturing the object, wherein the plurality of geometric features comprises a composite geometric feature including a plurality of geometric subfeatures;
access a database including strategies for machining different geometric features of the plurality of geometric features, wherein the database includes a composite strategy for machining the composite geometric feature and separate strategies for machining the respective geometric subfeatures, wherein the database includes data indicating one or more prioritized aspects associated with the composite strategy and the one or more prioritized aspects associated with the strategies for manufacturing the subfeatures;
obtain user input indicative of the one or more prioritized aspects of manufacturing of the object, the one or more prioritized aspects including tool life, surface quality, or object manufacturing speed;
compare a combined strategy obtained by combining the separate strategies for machining the geometric subfeatures to the composite strategy using the one or more prioritized aspects, so as to obtain a relative ranking between the composite strategy and the combined strategy, wherein the ranking of the composite strategy and the combined strategy is based on said data;
select, from the strategies included in the database, strategies for machining the respective geometric features via the subtractive manufacturing, wherein select the composite strategy for machining the composite geometric feature is performed responsive to the composite strategy being ranked higher than the combined strategy;
responsive to the combined strategy being ranked higher than the composite strategy, select the combined strategy for machining the composite geometric feature; and
provide instructions for causing one or more machine tools to manufacture the object in accordance with the selected strategies, wherein the selecting of the strategies, from the strategies included in the database, for machining the respective geometric features via the subtractive manufacturing includes selecting the composite strategy or the combined strategy for machining the composite geometric feature.

12. A machine tool of the one or more machine tools comprising the system of claim 11.

* * * * *